US012735925B2

(12) United States Patent
Zhang

(10) Patent No.: US 12,735,925 B2
(45) Date of Patent: Sep. 15, 2026

(54) DOOR STOPPER

(71) Applicant: Ningbo Hyderon Hardware Co., Ltd., Yuyao (CN)

(72) Inventor: Lifeng Zhang, Yuyao (CN)

(73) Assignee: Ningbo Hyderon Hardware Co., Ltd., Yuyao (CN)

( * ) Notice: Subject to any disclaimer, the term of this patent is extended or adjusted under 35 U.S.C. 154(b) by 0 days.

(21) Appl. No.: 19/014,283

(22) Filed: Jan. 9, 2025

(65) Prior Publication Data

US 2026/0193914 A1 Jul. 9, 2026

(51) Int. Cl.
*E05C 17/54* (2006.01)
*E05C 17/04* (2006.01)
*E05C 19/04* (2006.01)

(52) U.S. Cl.
CPC ............ *E05C 17/54* (2013.01); *E05C 17/047* (2013.01); *E05C 19/04* (2013.01)

(58) Field of Classification Search
CPC ........ E05C 17/54; E05C 17/047; E05C 19/04; Y10S 292/15; Y10T 292/71; Y10T 292/73; Y10T 292/65
See application file for complete search history.

(56) References Cited

U.S. PATENT DOCUMENTS 167,590 A * 9/1875 Vandeventer ........... E05C 19/04 292/73
288,028 A * 11/1883 Coultaus ................ E05C 19/04 292/153
382,283 A * 5/1888 Thomas .................. E05C 19/04 292/DIG. 19
397,380 A * 2/1889 Mitchell, Jr. ........... E05C 17/54 24/511
572,622 A * 12/1896 Westra ................ E05B 63/0056 292/23
679,400 A * 7/1901 Smith ..................... E05C 19/04 292/73
767,001 A * 8/1904 Mann .................... E05C 17/446 292/193
1,423,034 A * 7/1922 Scholl ..................... E05D 13/08 292/261

(Continued)

FOREIGN PATENT DOCUMENTS

JP 3201272 U * 12/2015
KR 20090099138 A * 9/2009 ............... B67B 7/44
KR 20100009816 U * 10/2010 ............... E05F 5/02

*Primary Examiner* — Christine M Mills
*Assistant Examiner* — Faria F Ahmad

(57) ABSTRACT

A door stopper comprising a door stopper head; the door stopper head is configured to be an arc shape, one end of the door stopper head is connected to a door stopper body used for stopping a door body, a spherical groove is formed in the door stopper head, and an anti-slip ball is arranged in the spherical groove; when in use, the anti-slip ball is in contact with the ground such that the anti-slip effect is achieved; friction is produced between the anti-slip ball and the spherical groove, and the anti-slip ball stops rotating; friction is also produced between the anti-slip ball and the ground for stopping the door; the surface of the anti-slip ball is provided with an anti-static material, so that the problem relating to easy absorption of dust and debris is solved and the dirt resistance is significantly enhanced.

2 Claims, 3 Drawing Sheets

(56) References Cited

U.S. PATENT DOCUMENTS

| | | | | | | |
|---|---|---|---|---|---|---|
| 1,469,943 | A | * | 10/1923 | Macura | E05C 17/54 | 116/82 |
| 1,560,562 | A | * | 11/1925 | Golding | E05F 5/08 | 292/79 |
| 1,636,627 | A | * | 7/1927 | Craven | E05C 17/54 | 292/76 |
| 1,845,417 | A | * | 2/1932 | Ingham | E05C 17/446 | 292/DIG. 58 |
| 1,875,965 | A | * | 9/1932 | Waters | E05C 17/446 | 16/44 |
| 1,914,542 | A | * | 6/1933 | Teich | E05C 19/04 | 292/73 |
| 2,030,705 | A | * | 2/1936 | Llewellyn | E05C 17/54 | 292/261 |
| D120,752 | S | * | 5/1940 | Gallinger | D8/402 | |
| 2,218,780 | A | * | 10/1940 | Andrews | E05C 17/54 | 292/342 |
| 2,487,427 | A | * | 11/1949 | Drake | E05C 17/54 | 292/343 |
| 2,595,709 | A | * | 5/1952 | Sands | E05C 17/443 | 292/238 |
| 2,973,215 | A | * | 2/1961 | Johnson | E05C 17/52 | 292/DIG. 19 |
| 2,988,392 | A | * | 6/1961 | Kuo | E05C 17/443 | 292/79 |
| 3,129,024 | A | * | 4/1964 | Schuessler | E05C 17/52 | 292/15 |
| 3,129,969 | A | * | 4/1964 | Kuo | E05C 17/443 | 16/86 A |
| 3,297,347 | A | * | 1/1967 | Rogers | E05C 17/52 | 292/74 |
| 3,415,561 | A | * | 12/1968 | Knox | E05F 5/08 | 292/341.19 |
| 4,688,761 | A | * | 8/1987 | Wilcox | B25B 27/0035 | 29/239 |
| 4,736,974 | A | * | 4/1988 | Rosenthal | E05C 17/54 | 292/342 |
| 5,217,269 | A | * | 6/1993 | Wiltberger | E05C 17/54 | 292/343 |
| 5,711,560 | A | * | 1/1998 | Gilbertson | E05C 17/54 | 292/343 |
| D410,380 | S | * | 6/1999 | Towns | A01G 23/099 | D8/402 |
| 6,481,052 | B1 | * | 11/2002 | Beall | E05C 17/54 | 269/53 |
| 7,644,964 | B2 | * | 1/2010 | Bushey | E05C 17/54 | 292/342 |
| D644,084 | S | * | 8/2011 | Canavan | D8/88 | |
| 8,296,902 | B1 | * | 10/2012 | Adrian | E05C 17/54 | 292/343 |
| 9,163,438 | B2 | * | 10/2015 | Mackay | E05C 17/44 | |
| 10,196,848 | B1 | * | 2/2019 | Fortmann | E05C 17/025 | |
| D856,128 | S | * | 8/2019 | Kazutaka | E05C 17/54 | D8/402 |
| 10,760,309 | B1 | * | 9/2020 | Bowman | E05C 17/54 | |
| 10,883,297 | B1 | * | 1/2021 | Seise | E05F 5/06 | |
| D1,005,807 | S | * | 11/2023 | Zhang | A47C 21/028 | D8/14 |
| 12,173,544 | B2 | * | 12/2024 | Reed | E05F 13/00 | |
| D1,073,426 | S | * | 5/2025 | Rizos | D8/47 | |
| 2024/0384579 | A1 | * | 11/2024 | Wang | E05C 17/54 | |
| 2024/0418019 | A1 | * | 12/2024 | Dimercurio | E05C 17/54 | |

* cited by examiner

DOOR STOPPER

TECHNICAL FIELD

This invention generally relates to the technical field of door stopping, and more particularly, to a door stopper.

BACKGROUND

Common doors, especially interior doors, may move accidentally due to factors such as airflow, slight vibration or accidental collision when they are not fully closed or in an open state. Therefore, a door stopper is needed for fixing a door at a certain position such that the door is kept open and stationary.

In the prior art, by arranging the door stopper in the gap between the door and the ground, the door is fixed. However, conventional door stoppers sold on the market have a single function, which can only be used on smooth and flat surfaces such as wooden and tiled surfaces. The door stopping effect is poor, and the use scenario is limited, resulting in the failure of use on rough surfaces such as carpets and blankets. In conference rooms and other scenarios with a carpet floor, the practicality is severely reduced.

SUMMARY

The purpose of the present invention is to provide a door stopper.

To achieve the above purpose, the present invention adopts the following technical solution: a door stopper comprises a door stopper head, wherein the door stopper head is configured to be an arc shape, one end of the door stopper head is connected to a door stopper body used for stopping a door body, a spherical groove is formed in the door stopper head, and an anti-slip ball is arranged in the spherical groove. The door stopper body moves by means of pushing the door body, and friction is produced between the anti-slip ball inside the door stopper head and the spherical groove as well as between the anti-slip ball and the ground, so that the anti-slip ball stops rotating and the door body is stopped.

In another preferred embodiment, the door stopper body is internally provided with a slot, a plurality of reinforcing plates arranged in a criss-cross manner are connected in the slot.

In another preferred embodiment, the surface of the door stopper body is configured to be inclined.

Compared with the prior art, the present invention has the following advantages: the door stopper is capable of effectively stopping doors on various ground surfaces through the anti-slip ball and the spherical groove; when in use, the anti-slip ball is in contact with the ground such that the anti-slip effect is achieved; when the door body moves to one side, the door stopper body receives a force from the other side, and the anti-slip ball begins to rotate in the spherical groove; due to the anti-slip property of the anti-slip ball, friction is produced between the anti-slip ball and the spherical groove, and the anti-slip ball stops rotating; meanwhile, friction is also produced between the anti-slip ball and the ground for stopping the door; the door stopper is also capable of stopping a doors on carpet, greatly improving the practicality; the surface of the anti-slip ball is provided with an anti-static material, which prevents static electricity from being generated by the friction between the anti-slip ball 4 and the carpet/other objects; thus, the problem relating to easy absorption of dust and debris is solved and the dirt resistance is significantly enhanced.

In Figures: 1—Door Stopper Head, 2—Door Stopper Body, 3—Spherical Groove, 4—Anti-slip Ball, 5—Door Body, 6—Slot, 7—Reinforcing Plate, 8—Hollowed-out Groove.

DETAILED DESCRIPTION

While specific embodiments of the invention have been described in detail, it will be appreciated by those skilled in the art that various modifications and alternatives to those details could be developed in light of the overall teachings of the invention. Accordingly, the particular arrangements disclosed are meant to be illustrative only and not limiting as to the scope of the invention which is to be given the full breadth of the claims appended and any and all equivalents thereof.

Embodiment 1

Figure 1:
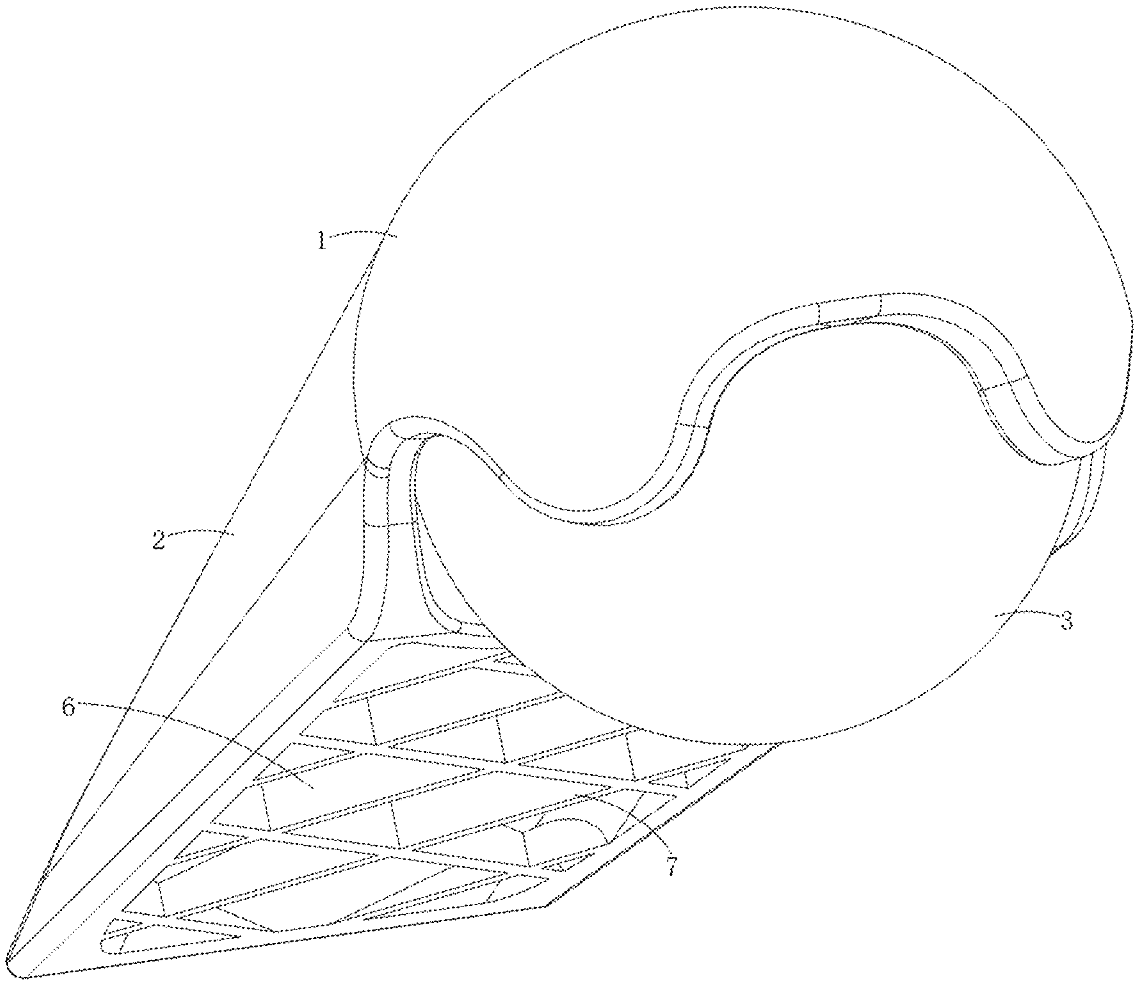
FIG. 1 is a schematic diagram illustrating an exemplary structure of the present invention.
Figure 2:
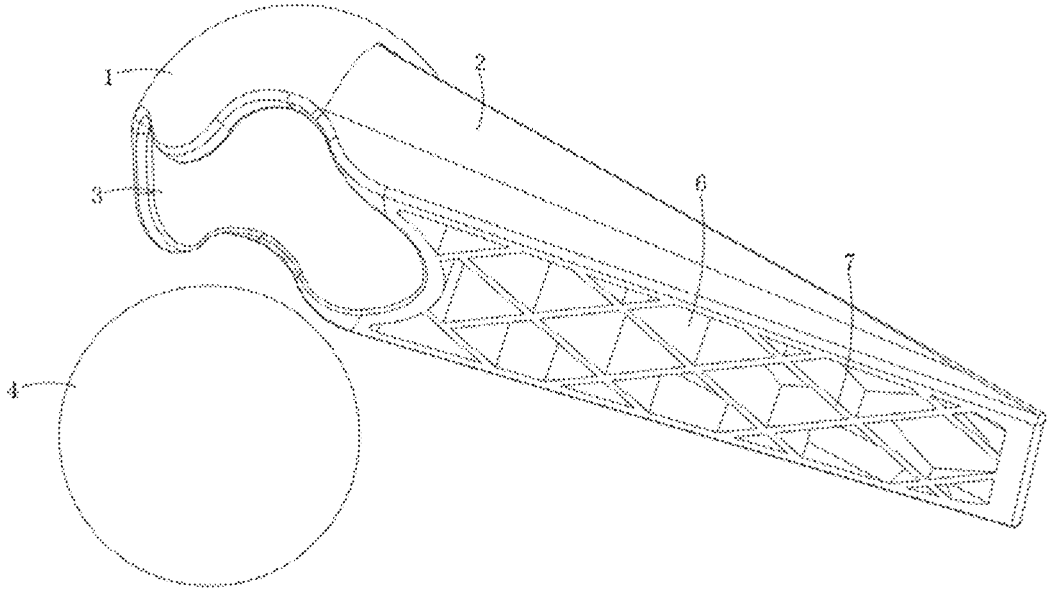
FIG. 2 is a schematic diagram illustrating an explosive view of the present invention.
Figure 3:
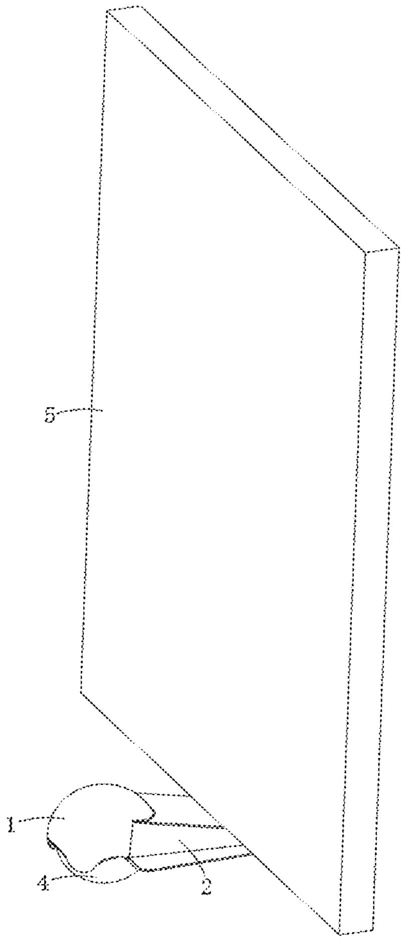
FIG. 3 is a schematic diagram illustrating an exemplary structure when the door stopper body is used in conjunction with the door body of the present invention.

Referring to FIGS. 1-3, the door stopper of the present invention comprises a door stopper head 1, wherein the door stopper head 1 is configured to be an arc shape, one end of the door stopper head 1 is connected to a door stopper body 2 used for stopping a door body 5, a spherical groove 3 is formed in the door stopper head 1, and an anti-slip ball 4 is arranged in the spherical groove 3. The door stopper body 2 moves by means of pushing the door body 5, and friction is produced between the anti-slip ball 4 inside the door stopper head 1 and the spherical groove 3 as well as between the anti-slip ball 4 and the ground, so that the anti-slip ball 4 stops rotating and the door body 5 is stopped.

The door stopper body 2 is internally provided with a slot 6, a plurality of reinforcing plates 7 arranged in a criss-cross manner are connected in the slot 6, and the reinforcing plates 7 are capable of distributing the pressure imposed by the door body 5 to the entire door stopper structure, thereby preventing the door stopper from being deformed or damaged under pressure.

The surface of the door stopper body 2 is configured to be inclined, and the trapezoidal inclined surface of the door stopper body 2 is suitable for doors with different door gaps.

In use, the door stopper is placed at a suitable position that is in contact with the ground when the door is opened. The door stopper head 1 is close to a side of the door body 5, and the inclined surface of the door stopper body 2 faces the direction in which the door body 5 is opened. The anti-slip ball is embedded inside the door stopper head 1 and is prevented from falling off. The anti-slip ball is partially exposed to be in contact with the ground. At this point, the anti-slip ball 4 inside the spherical groove 3 is in a relatively stationary state, and the bottom of the door stopper body 2 is in contact with the ground. When the door body 5 moves in the opening direction and is in contact with the door stopper body 2, the door body 5 imposes a pushing force on the door stopper body 2. Because the door stopper body 2 is configured to be inclined and is made of a soft rubber material, the pushing force is decomposed into a pressure perpendicular to the ground and a component force along the ground. The pressure perpendicular to the ground enables the door stopper body 2 to be more tightly attached on the ground, further increasing the friction between the door stopper and the ground. Especially, the door stopper body 2 made of the soft rubber material is tightly attached to the ground when being pressed, so that the stability is significantly improved. The component force along the ground pushes the door stopper body 2 to move in the direction away from a door shaft.

Along with the movement of the door stopper body 2, the anti-slip ball 4 in the door stopper head 1 starts to rotate. Due to the friction between the anti-slip ball 4 and an inner wall of the spherical groove 3 as well as between the anti-slip ball 4 and the ground, the rotation of the anti-slip ball 4 is hindered. Meanwhile, the friction between the anti-slip ball 4 and the ground also prevents the door stopper from sliding on the ground, and when the anti-slip ball 4 is in contact with different grounds, enough friction force is produced due to its own properties. For example, on a carpeted ground, the anti-slip ball 4 is capable of being trapped in the carpet to increase the contact area and friction with the ground, and on a smooth ground, the frictional performance of the anti-slip ball 4 also effectively prevents the door stopper from sliding. When the resistance produced by the friction between the anti-slip ball 4 and the inner wall of the spherical groove 3 as well as between the anti-slip ball 4 and the ground is sufficient to resist the pushing force imposed on the door stopper by the door body 5, the door stopper stops moving, and the anti-slip ball 4 also stops rotating, so that the door body 5 is effectively stopped and the door is kept at the current position.

The surface of the anti-slip ball 4 is provided with an anti-static material, which prevents static electricity from being generated by the friction between the anti-slip ball 4 and the carpet/other objects. Thus, the problem relating to easy absorption of dust and debris is solved and the dirt resistance is greatly improved.

Embodiment 2

Figure 4:
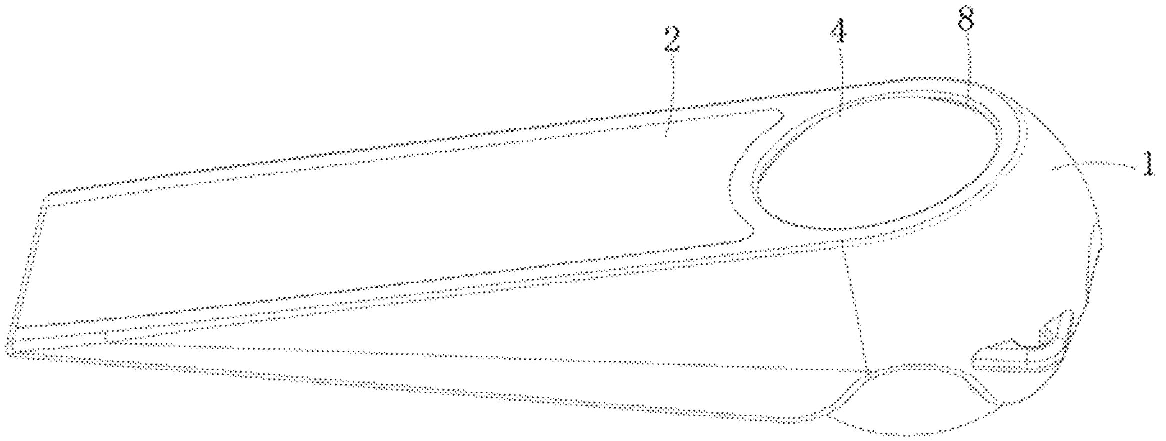
FIG. 4 is a schematic diagram illustrating the hollowed-out groove formed in the top of the door stopper head of the present invention.
Figure 5:
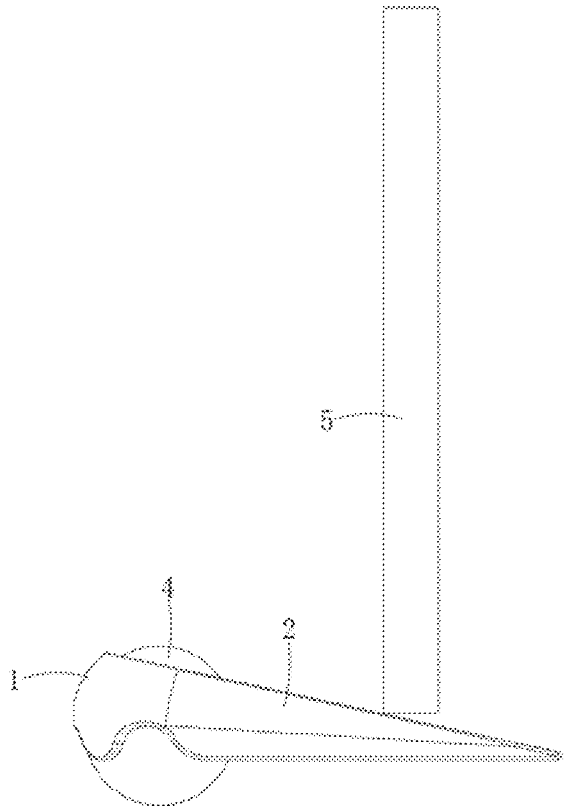
FIG. 5 is a schematic diagram illustrating an exemplary structure when the door stopper body having the hollowed-out groove is used in conjunction with the door body of the present invention.

Referring to FIGS. 4-5, the top of the door stopper 1 is provided with a hollowed-out groove 8, and the top of the anti-slip ball 4 in the spherical groove 3 protrudes out from the hollowed-out groove 8, thereby allowing a user to directly observe the operating condition of the top of the anti-slip ball 4 through the hollowed-out groove 8. Through adopting this arrangement, in prolonged use, whether the anti-slip ball 4 is excessively worn is found in time, and phenomenons such as a scratch, deformation and wear occur on the surface of the anti-slip ball 4 are observed. Once there is an abnormal phenomenon, the anti-slip ball 4 is maintained or replaced in time, thereby always keeping a high anti-slip performance of the door stopper 1.

Meanwhile, by means of the hollowed-out groove 8, whether the position of the anti-slip ball 4 in the spherical groove 3 is normal is observed. By observing from the hollowed-out groove 8, when the anti-slip ball 4 deviates or gets stuck such that its rolling and anti-slip performances are affected, the position of the anti-slip ball 4 is adjusted in in time. In this way, the normal operation is ensured.

The above are merely preferred embodiments of the present invention, and the scope of the present invention is not limited to the embodiments described above. Although the present invention has been described in detail with reference to the above embodiments, it is still possible for those skilled in the art to modify the technical solutions described in the above embodiments or to make equivalent replacements for some of the technical features. Therefore, any modifications, equivalent replacements and improvements made within the spirit and principles of the present invention should fall within the scope defined by the claims of the present invention.

What is claimed is:

1. A door stopper, comprising:

a door stopper head (1), wherein the door stopper head (1) is configured to be an arc shape, wherein one end of the door stopper head (1) is connected to a door stopper body (2) used for stopping a door body (5), wherein a spherical groove (3) is formed in the door stopper head (1), wherein an anti-slip ball (4) is arranged in the spherical groove (3), wherein the door stopper body (2) moves by means of pushing the door body (5), and wherein friction is produced between the anti-slip ball (4) inside the door stopper head (1) and the spherical groove (3) as well as between the anti-slip ball (4) and the ground, so that the anti-slip ball (4) stops rotating and the door body (5) is stopped, wherein the door stopper body (2) is internally provided with a slot (6), and wherein a plurality of reinforcing plates (7) arranged in a criss-cross manner are connected in the slot (6).

2. The door stopper of claim 1, wherein the surface of the door stopper body (2) is configured to be inclined.

* * * * *